United States Patent
Sung

(10) Patent No.: US 9,161,049 B2
(45) Date of Patent: Oct. 13, 2015

(54) SYSTEM AND METHOD FOR DECODING AND DEBLOCKING VIDEO FRAME

(75) Inventor: Lien-Hsiang Sung, Taipei (TW)

(73) Assignee: VIA TECHNOLOGIES, INC., Hsien-Tien, Taipei (TW)

( * ) Notice: Subject to any disclaimer, the term of this patent is extended or adjusted under 35 U.S.C. 154(b) by 453 days.

(21) Appl. No.: 12/962,334

(22) Filed: Dec. 7, 2010

(65) Prior Publication Data

US 2011/0158327 A1    Jun. 30, 2011

(30) Foreign Application Priority Data

Dec. 31, 2009  (TW) ................. 98146292 A

(51) Int. Cl.
*H04N 7/26*         (2006.01)
*H04N 19/423*       (2014.01)
*H04N 19/86*        (2014.01)

(52) U.S. Cl.
CPC ............. *H04N 19/423* (2014.11); *H04N 19/86* (2014.11)

(58) Field of Classification Search
CPC . H04N 7/50; H04N 7/26335; H04N 7/26707; H04N 7/26946; H04N 7/26244
USPC ................. 375/240.25, 240.16; 382/233, 261
IPC ........................................................ H04N 7/26
See application file for complete search history.

(56) References Cited

U.S. PATENT DOCUMENTS

| 5,559,557 A * | 9/1996 | Kato ........................ 375/240.03 |
| 2004/0057624 A1* | 3/2004 | Wells ............................ 382/233 |
| 2006/0029135 A1* | 2/2006 | Zhou et al. ............... 375/240.12 |
| 2008/0310504 A1* | 12/2008 | Ye et al. .................... 375/240.02 |
| 2008/0310512 A1* | 12/2008 | Ye et al. .................... 375/240.16 |
| 2010/0080296 A1* | 4/2010 | Lee et al. ................. 375/240.16 |
| 2010/0142844 A1* | 6/2010 | Pereira et al. ................. 382/261 |

FOREIGN PATENT DOCUMENTS

CN          101179720       5/2008

OTHER PUBLICATIONS

English language translation of abstract of CN 101179720 (published May 14, 2008).

\* cited by examiner

*Primary Examiner* — Thao X Le
*Assistant Examiner* — Long Le
(74) *Attorney, Agent, or Firm* — McClure, Qualey & Rodack, LLP

(57) ABSTRACT

The invention provides a system and method for decoding and deblocking a video frame having a plurality of macroblocks. The system of the invention comprises a decoder configured to decode the macroblocks, a deblock configured to deblock the macroblocks, and a deblock buffer comprising a plurality of counters corresponding to the plurality of macroblocks respectively. Each counter corresponds to a macroblock group comprising a predetermined amount of neighboring macroblocks. In response to a counter is incremented to a fixed value, the macroblock group corresponds to the counter is deblocked.

18 Claims, 6 Drawing Sheets

FIG. 2

SYSTEM AND METHOD FOR DECODING AND DEBLOCKING VIDEO FRAME

CROSS REFERENCE TO RELATED APPLICATIONS

This Non-provisional application claims priority under 35 U.S.C. §119(a) on Patent Application No(s). 98146292, filed in Taiwan, Republic of China on Dec. 31, 2009, the entire contents of which are hereby incorporated by reference.

BACKGROUND OF THE INVENTION

1. Field of the Invention

The invention relates to system for video decoding and deblocking and the method thereof, and more particularly for reducing buffer memory required by video decoding and deblocking.

2. Description of the Related Art

To solve the problem that video files are often too large for transmission, video decoding is adopted to minimize the file size and thus to reduce storage space required and transmission load. Also, the distortion of image quality should be controlled within an acceptable range.

Many video decode standard performs encoding and decoding on the basis of macroblock. Take H.264/AVC (Advanced Video Coding) as an example, a video frame is partitioned into a plurality of macroblocks, each macroblock is 16×16 pixels. When performing macroblock encoding, the original pixel values of the video frame is replaced by approximate values in order to reduce the data quantity. However, pixel values of neighboring macroblocks may have large differences after decoding, and thus causes the images become unnatural. Therefore, the video frame must undergo deblocking process in order to minimize the differences between neighboring macroblocks so that the video quality can be improved.

FIG. 1 depicts an example of two neighboring macroblocks. Macroblocks 10 and 20 comprise a plurality of pixels respectively. Pixels of macroblock 10 are denoted as P1 and pixels of macroblock 20 are denoted as P2. When performing deblocking, pixels belonging to different macroblocks like P1 and P2 can be performed with, for example, interpolation so as to soften the edge.

FIG. 2 depicts a block diagram of a video frame 200 having 256×64 pixels. The video frame 200 is partitioned in to 16×4 macroblocks, each macroblock comprises 16×16 pixels. The macroblocks are denoted as MB(0,0), MB(0,1) ... MB(3,15) respectively. In the case that the video decoder performs decoding on the basis of macroblock and in sequence, deblocking of the edge C(0,1) between MB(0,0) and MB(0,1) can only be performed after decoding of MB(0,0) and MB(0, 1) completes. Similarly, the edge R(0,1) can only be deblocked after MB(0,0) and MB(1,0) are both decoded.

The video decoder may not decode the macroblocks in order, but in random under some circumstances. For example, flexible macroblock ordering (FMO) mode or arbitrary slice ordering (ASO) mode in H.264/AVC. But video deblocking must be performed in order in conventional video processing. As a result, there is equipped with a deblock buffer for recording the decode status of each macroblock in conventional video processing system so that the deblocking process may cooperate with decoding process. FIG. 3 depicts a block diagram of a deblock buffer adopted in video processing. The deblock buffer 300 comprises 16×4 bits, each bit corresponds to the decode status of each one of the 16×4 macroblocks in video frame 200 respectively. For example, bit value 1 denotes that the corresponding macroblock has been decoded. It can be known from FIG. 3 that MB(0,0), (1,12), (2,0) ... etc. have been decoded.

In addition, when the resolution of the video image goes higher, the deblock buffer space increases as well. For example, a full HD video frame comprises 1920×1080 pixels, that means the deblock buffer should have at least 8,160 bits, which is significantly large. As a result, there exists a need to evolve a solution that can reduce the buffer space required for video decoding and deblocking.

BRIEF SUMMARY OF THE INVENTION

In an embodiment of the present invention provides a system for performing video decode and deblock on a video frame, the video frame comprise a plurality of macroblocks. The system comprises a decoder configured to decode the plurality of macroblocks; and a deblock buffer comprising a plurality of counters. Each of the plurality of counters corresponds to a macroblock group of the plurality of macroblocks respectively. The macroblock group of the macroblocks comprises a predetermined amount of neighboring macroblocks, and the counter is incremented by one in response to one of the macroblocks of the corresponding macroblock group is decoded. The system also comprises a deblock filter configured to deblock the corresponding macroblock group in response to the counter is incremented to a fixed value.

In another embodiment of the invention provides a method for decoding and deblocking a video frame. The video frame comprises a plurality of macroblocks. The method comprises decoding the plurality of macroblocks, and incrementing one of a plurality counters by one in response to one of a plurality of macroblocks is decoded. The plurality of macroblock is partitioned into a plurality of macroblock groups and each of the macroblock group corresponds to a counter. The method also comprises deblocking one of the macroblock groups in response to the counter corresponding to the macroblock group is incremented to a fixed value.

BRIEF DESCRIPTION OF DRAWINGS

The invention can be better understood by reading the subsequent detailed descriptions and embodiments with references made to the accompanying drawings.

FIG. 2 illustrates a block diagram of a video frame 256×64 pixels;

DETAILED DESCRIPTION OF THE INVENTION

Embodiments of the invention relate to a system for performing video decoding and deblocking and method thereof. The system is configured to decode and deblock a video frame having a plurality of macroblocks. The video frame may comprise A×B pixels and is partitioned into C×D macroblocks, in which each macroblock comprises E×F pixels. A, B, C, D, E and F are all positive integers and A×B=C×D×E×F. To simplify the description, video frame of following embodiments comprises 256×64 pixels and is partitioned into 16×4 macroblocks, each macroblock comprises 16×16 pixels as illustrated in FIG. 4.

Figure 4:
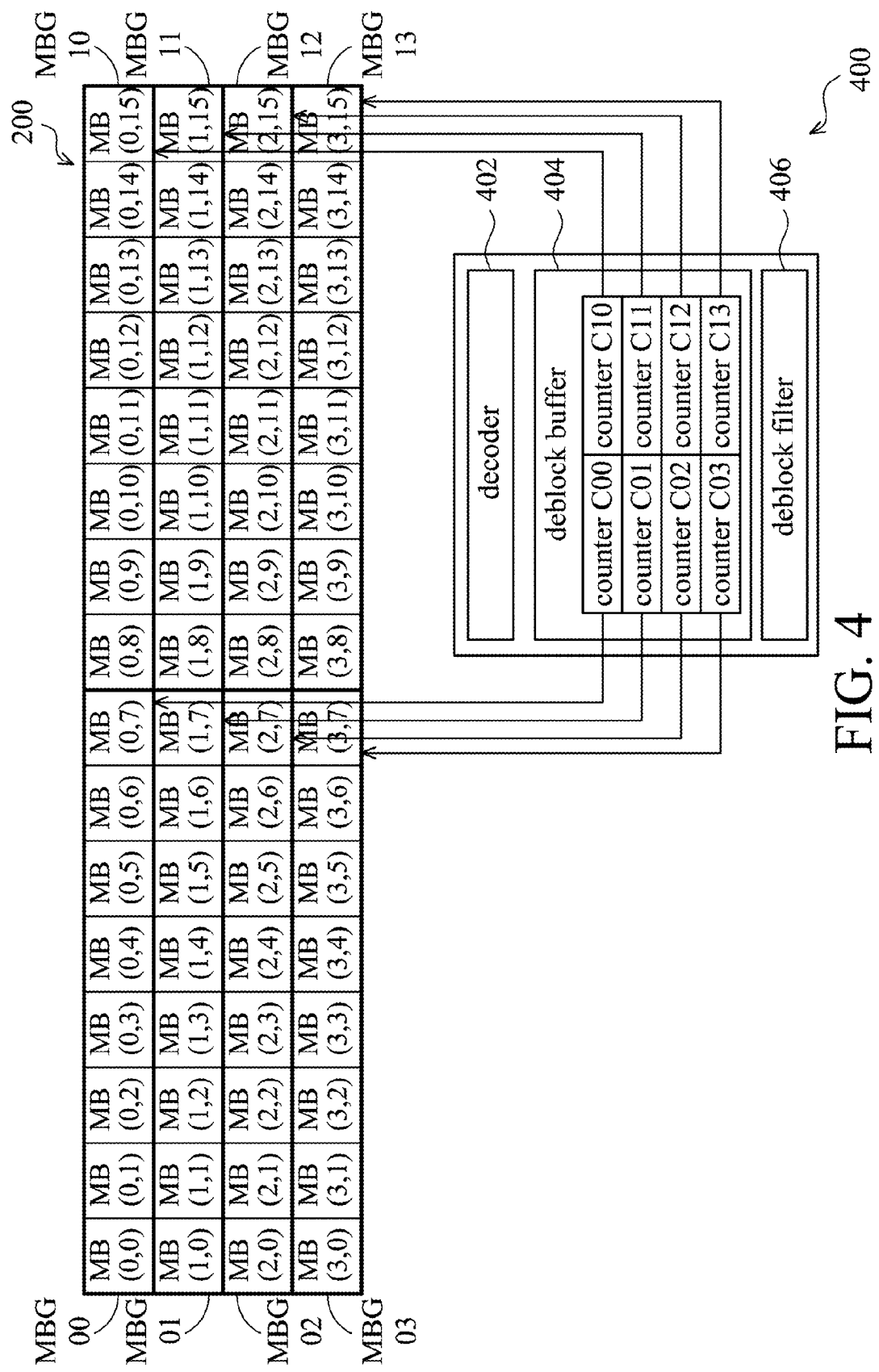
FIG. 4 illustrates a block diagram of a video decode/deblock system according to an embodiment of the invention.

FIG. 4 illustrates block diagram of video decode/deblock system 400 according to an embodiment of the invention. The video decode/deblock system 400 comprises a decoder 402, a deblock buffer 404 and a deblock filter 406.

The decoder 402 of the embodiment may decode macroblocks in arbitrary order. Please note that the arbitrary order here refers to random, regular or irregular order. Although arbitrary order is utilized in the present embodiment, but the invention is not limited to such order, order with fixed arrangement is also included within the scope of the invention. In other embodiments, decoding of macroblocks may be performed in sequential order.

The deblock buffer 404 comprises a plurality of counters. In an embodiment of the invention, every N×M neighboring macroblocks are grouped as a macroblock group, and each one of the counters within deblock buffer 404 corresponds to a macroblock group. To simplify the description, every eight neighboring macroblocks are grouped as a macroblock group in the embodiment. That is, N=8 and M=1. For example, MBs(0,0) to (0,7) are macroblock group 00, MBs(1,0) to (1,7) are macroblock group 01, and so on. Referring to FIG. 4, the embodiment comprises 8 counters C00 to C13, which correspond to macroblock groups 00 to 13 respectively. According to an embodiment of the invention, the counter is set to zero when none of the macroblocks correspond to that counter is decoded. When one of the corresponding macroblock is decoded, the counter in incremented by one, and thus so on.

In an embodiment of the invention, the deblock filter 406 deblocks the macroblock groups in predetermined order. When a current counter is incremented to N×M, which is 8 in the present embodiment, and macroblock groups having prior order than the current macroblock group corresponding to the current counter are all decoded, deblock filter 406 starts to deblock all of the macroblocks within the current macroblock group. In the present embodiment, the macroblocks are deblocked in the order from left to right, from top to bottom. When the current counter is incremented to 8, and all macroblocks at the left and on the top of the corresponding macroblock group have been decoded, deblock filter 406 will deblock macroblocks within the current macroblock group corresponding to the current counter.

Figure 2:
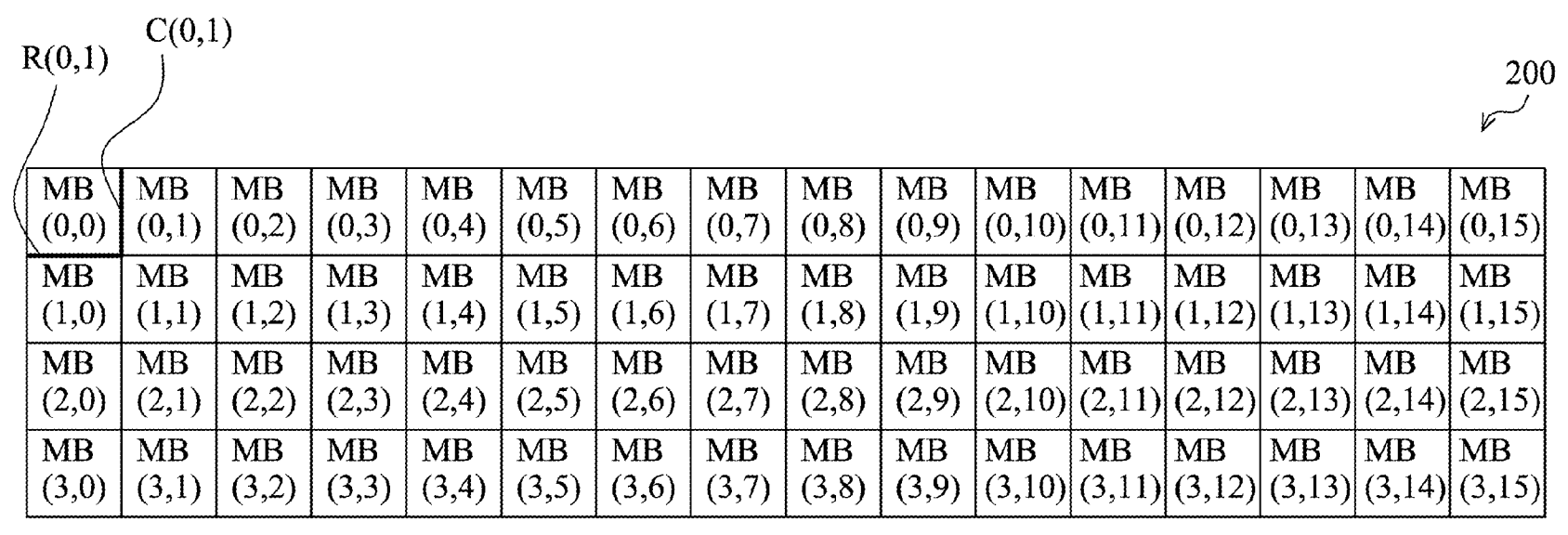
Figure 5:
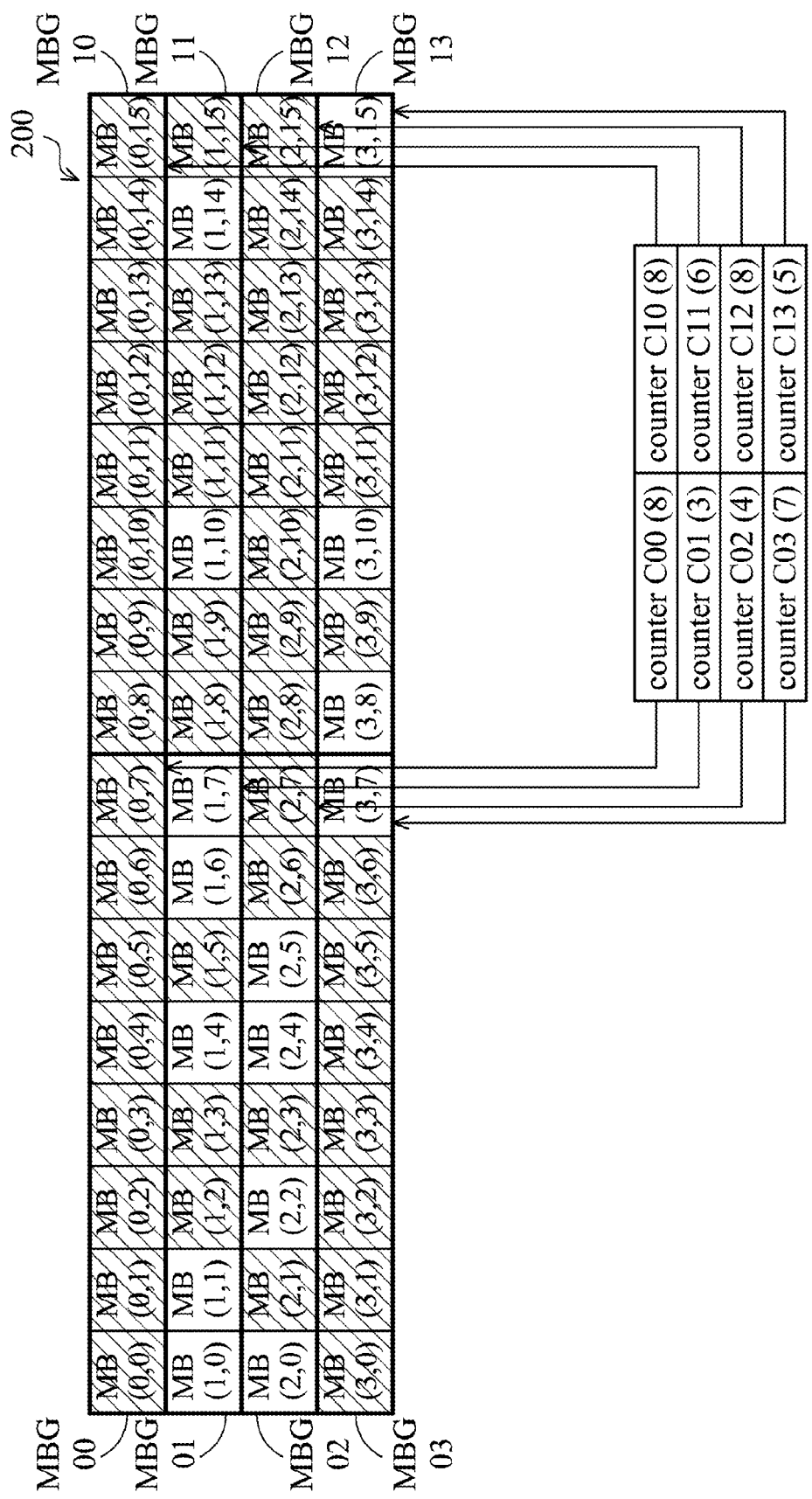
FIG. 5 illustrates a block diagram of a counter and corresponding video frame according to an embodiment of the invention.

FIG. 5 illustrates a block diagram of counter and corresponding video frame according to an embodiment of the present invention. The video frame of the present embodiment is similar to the video frames illustrated in FIGS. 2 and 4. Several macroblocks within macroblock group MBG00 to MBG13 have been decoded, which are denoted by slash lines, for examples MB(0,1), (3,14), . . . etc. Macroblocks that are not yet decoded are left blank. In the embodiment of FIG. 5, counter C00 to C03 and C10 to C13 are respectively incremented to 8, 3, 4, 7, 8, 6, 8 and 5 corresponding to MGB00 to MBG03 and MGB10 to MBG13. Among all, counters C00, C10 and C12 are incremented to 8, which mean that MBG00, MBG10 and MBG12 have finished decoding of all macroblocks. Therefore, the deblock filter 406 may deblock macroblocks MB(0, 0) to (0,7) of MBG00 first. After deblocking of MBG00 finishes, the deblock filter 406 proceeds to deblock MBG10 since that all the macroblocks located at the left and at the top of MBG10 have been decoded. However, due to that macroblock groups at the left and top of macroblock group MBG12, which are MBG11 and MBG02, are not yet decoded, the deblock filter 406 would not deblock MBG12 at this time.

Figure 1:
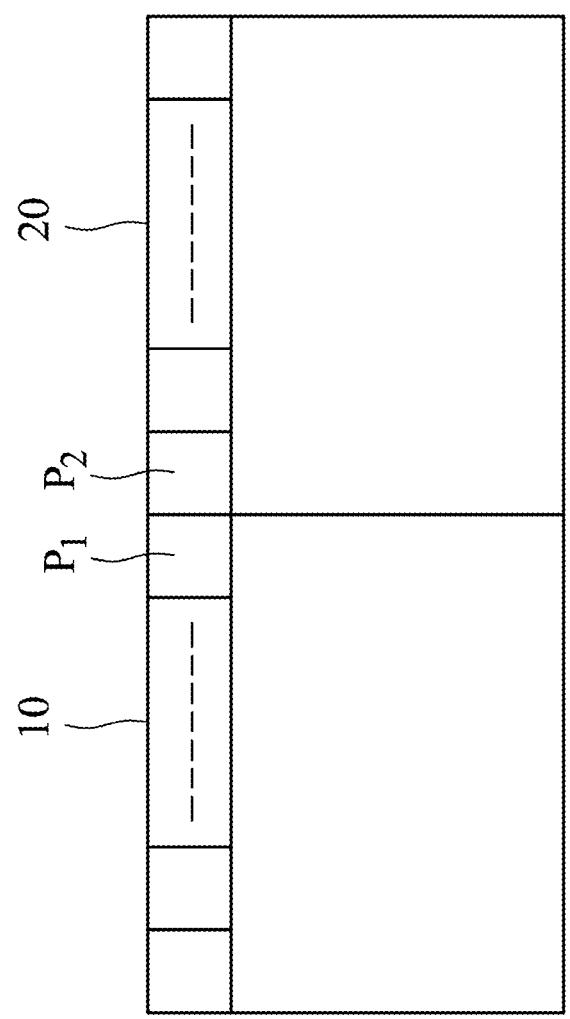
FIG. 1 illustrates a block diagram of two neighboring macroblocks.
Figure 3:
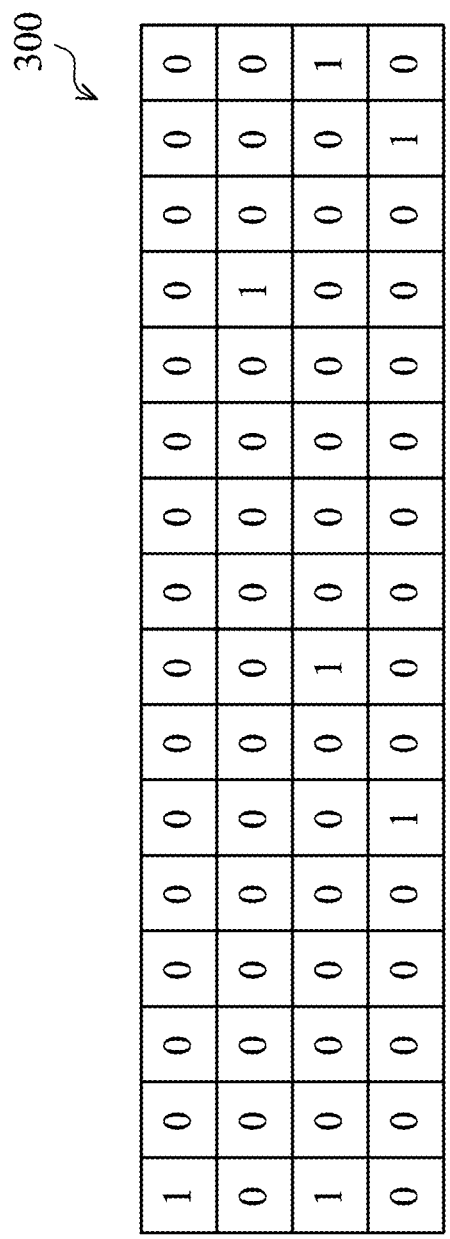
FIG. 3 illustrates a block diagram of a deblock buffer.

It should be noted that each counter may comprise k bits. In some embodiments of the invention, if the video frame is such partitioned that every N×M neighboring macroblocks consist a macroblock group, then k is designated by satisfying below equation: $2^k \geq (N \times M)+1$. One with ordinary skill in the art may designate other values for k as long as the counter could count to at least the number of N×M. In a preferred embodiment of the invention, N×M is at least larger than 2, but is not limited to this number. In the embodiment of FIG. 4, N×M is 8, which means that every 8 macroblocks consists a macroblock group, and k is 4 ($2^4 \geq 9$). For video frame 200 of FIGS. 4 and 5, the deblock buffer requires 32 bits and saves at least 50% of memory space comparing to the embodiment of FIG. 3. Reduction of the buffer space improves the efficiency of video decode/deblock.

Figure 6:
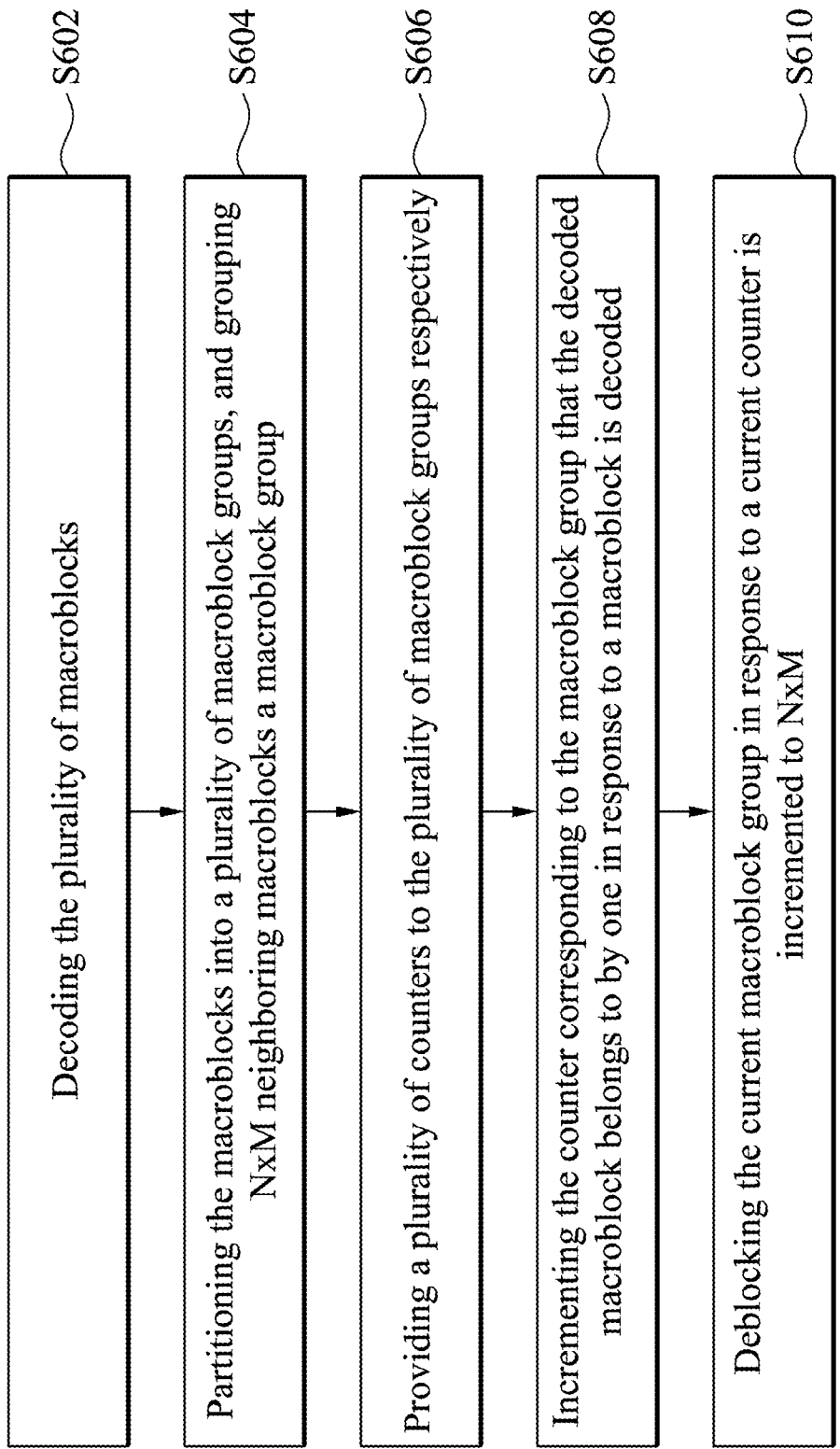
FIG. 6 illustrates a flow diagram of a method for video decode and deblock process according to an embodiment of the invention.

The invention also provides a method for video decode and deblock. FIG. 6 illustrates a flow of a method thereof according to an embodiment of the invention. The method is utilized to decode and deblock a video frame having a plurality of macroblocks. The flow begins from step S602, the plurality of macroblocks are decoded. The macroblocks can be decoded in any order, for example sequential, random or any other predetermined order. At step S604, the macroblocks are partitioned into a plurality of macroblock groups. N×M neighboring macroblocks are grouped as a macroblock group. Next at step S606, a plurality of counters are provided to the plurality of macroblock groups respectively. Each of the counters comprises k bits, which satisfies $2^k \geq (N \times M)+1$. At step S608, in response to a macroblock is decoded, the counter corresponding to the macroblock group that the decoded macroblock belongs to is incremented by one. Finally at step S610, in response to a current counter is incremented to N×M, which means that all of the macroblocks of the current macroblock group corresponding to the current counter have been decoded, and in response to that all of the macroblock groups having prior order than the current macroblock group have been decoded, the current macroblock group is deblocked. The macroblock groups are deblocked in the order from left to right and from top to bottom. The current macroblock group is deblocked when all of the macroblock groups at the left and at the top of the current macroblock groups have been decoded.

In previous described embodiments, each video frame may comprise A×B pixels. Each video frame is partitioned into C×D macroblocks, and each macroblock comprises E×F pixels. A, B, C, D, E and F are all positive integers, and satisfy A×B=C×D×E×F. Furthermore, N×M macroblocks are grouped as a macroblock group. In a preferred embodiment, video frame is partitioned by 16×16 pixels (E=F=16), and N×M is at least 2. It should be noted that the invention is not limited to the preferred embodiment.

Although the invention is disclosed by above embodiments, it is not intended to limit the scope of the invention to those embodiments. One with ordinary skill in the art may realize that other embodiments, variations or modifications can be implemented without departing from the spirit of the invention.

What is claimed is:

1. A system for performing video decoding and deblocking on a video frame, the video frame comprise a plurality of macroblocks, the system comprising:
   a decoder, configured to decode the plurality of macroblocks;
   a deblock buffer, comprising a number of counters, wherein the number of counters is at least two, wherein each of the plurality of counters comprises k bits, and k satisfies $2^k \geq (N \times M)+1$ and wherein each of the counters corresponds to a macroblock group of the plurality of macroblocks respectively, and the macroblock group comprises N×M neighboring macroblocks of the video frame, such that the number of counters corresponds directly to a number of macroblock groups, each macroblock group of the macroblocks comprises a predetermined amount of neighboring macroblocks, and the counter is incremented by one for each decoding of one of the macroblocks of the corresponding macroblock group, wherein a count value of each counter represents the number of macroblocks of the corresponding macroblock group that have been decoded; and a deblock filter, configured to deblock the corresponding macroblock group in response to the counter associated with the corresponding macroblock group being incremented to a predetermined value.

2. The system of claim 1, where in the fixed value is N×M.

3. The system of claim 1, wherein N×M is at least 2.

4. The system of claim 1, wherein the deblock filter deblocks the macroblock groups in a predetermined order.

5. The system of claim 1, wherein the video frame comprises A×B pixels, A and B are positive integers.

6. The system of claim 1, wherein the decoder decodes in H.264/AVC.

7. The system of claim 4, wherein the deblock filter deblocks the macroblock group in response to the corresponding counter of the macroblock group is incremented to the fixed value and macroblock groups at left and at top of the macroblock group are decoded.

8. The system of claim 4, wherein the predetermined order is from left to right and from top to bottom.

9. The system of claim 5, wherein the video frame comprises C×D macroblocks, and each of the macroblocks comprises E×F pixels, C, D, E, and F are positive integers and A×B=C×D×E×F.

10. A method for decoding and deblocking a video frame, the video frame comprises a plurality of macroblocks; the method comprising:

decoding the plurality of macroblocks;

incrementing one of a number of counters by one in response to one of a plurality of macroblocks in a corresponding group of macroblocks being decoded, wherein the number of counters is at least two, wherein each of the plurality of counters comprises k bits, and k satisfies $2^k \geq (N \times M)+1$, the plurality of macroblocks is partitioned into a plurality of macroblock groups and each macroblock group comprises N×M neighboring macroblocks, wherein the number of counters equals the number of macroblock groups, wherein a count value of each counter represents the number of macroblocks of the corresponding macroblock group that have been decoded; and deblocking one of the macroblock groups in response to the counter corresponding to the macroblock group being incremented to a predetermined value.

11. The method of claim 10, wherein the fixed value is N×M.

12. The method of claim 10, wherein N×M is at least 2.

13. The method of claim 10, wherein the deblocking is performed in a predetermined order.

14. The system of claim 10, wherein the video frame comprises A×B pixels, A and B are positive integers.

15. The system of claim 10, wherein the decoding is performed in H.264/AVC standard.

16. The system of claim 13, further comprising deblocking the macroblock group in response to the counter corresponding to the macroblock group is incremented to the fixed value and macroblock groups having prior order than the macroblock group are decoded.

17. The system of claim 13, wherein the predetermined order is from left to right, from top to bottom.

18. The system of claim 14, wherein the video frame comprises C×D macroblocks, and each of the macroblocks comprises E×F pixels, C, D, E, and F are positive integers and A×B=C×D×E×F.

* * * * *